US011313223B2

(12) United States Patent
Wu et al.

(10) Patent No.: US 11,313,223 B2
(45) Date of Patent: Apr. 26, 2022

(54) GAMMA RAY SPECTRUM UNFOLDING METHOD FOR ELEMENTAL CAPTURE SPECTROSCOPY LOGGING AND DEVICE THEREFOR

(71) Applicant: PETROCHINA COMPANY LIMITED, Beijing (CN)

(72) Inventors: Hongliang Wu, Beijing (CN); Ning Li, Beijing (CN); Zhou Feng, Beijing (CN); Changlin Lan, Beijing (CN); Tao Lv, Beijing (CN); Kewen Wang, Beijing (CN); Qingfu Feng, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 134 days.

(21) Appl. No.: 16/470,539

(22) PCT Filed: Dec. 10, 2018

(86) PCT No.: PCT/CN2018/120083
§ 371 (c)(1),
(2) Date: Jun. 17, 2019

(87) PCT Pub. No.: WO2019/128685
PCT Pub. Date: Jul. 4, 2019

(65) Prior Publication Data
US 2021/0355822 A1 Nov. 18, 2021

(30) Foreign Application Priority Data
Dec. 26, 2017 (CN) .......................... 201711429674.3

(51) Int. Cl.
*G01V 5/12* (2006.01)
*E21B 49/00* (2006.01)
*G01V 5/10* (2006.01)

(52) U.S. Cl.
CPC ............. *E21B 49/00* (2013.01); *G01V 5/101* (2013.01)

(58) Field of Classification Search
CPC .............................. E21B 49/00; G01V 5/101
See application file for complete search history.

(56) References Cited

U.S. PATENT DOCUMENTS

| 5,440,118 A * | 8/1995 | Roscoe ................. G01V 5/101 250/262 |
| 6,751,557 B1 | 6/2004 | Shehab et al. |
| 2003/0106993 A1 | 6/2003 | Chen et al. |

FOREIGN PATENT DOCUMENTS

| CN | 101078776 A | 11/2007 |
| CN | 202256719 A | 5/2012 |
(Continued)

OTHER PUBLICATIONS

J.S. Schweitzer, "Developments in elemental concentration logging and applications", IEEE Transaction on Nuclear Science, vol. 38 No. 2, pp. 796-798. (Year: 1991).*
(Continued)

*Primary Examiner* — Kiho Kim
(74) *Attorney, Agent, or Firm* — Foley & Lardner LLP (57) ABSTRACT

A gamma ray spectrum unfolding method for elemental capture spectroscopy logging and a device therefor including the steps of first preprocessing the data obtained from an elemental capture spectrometry instrument; constructing a primary element group and an auxiliary element group according to the degree of interactions among the elements via theoretical analysis and numerical calculation of spectrum profiles, characteristic peak channels, and backgrounds of different elements; unfolding by using the least square method based on the construction of the primary element group and the auxiliary element group; and finally reconstructing the spectrum based on theory according to the yield (Continued)

Figure 7 of each element obtained by unfolding with the least square method, and comparing the measured gamma ray spectrum with the reconstructed gamma ray spectrum for error control, thereby improving the spectrum unfolding precision.

12 Claims, 5 Drawing Sheets

(56) References Cited

FOREIGN PATENT DOCUMENTS

| CN | 102518431 A | 6/2012 |
| --- | --- | --- |
| CN | 104297810 A | 1/2015 |
| CN | 104316971 A | 1/2015 |
| CN | 105093343 A | 11/2015 |
| CN | 107229080 A | 10/2017 |
| WO | WO-2014/110080 A1 | 7/2014 |
| WO | WO-2017/123856 A1 | 7/2017 |

OTHER PUBLICATIONS

English-language Translation of First Office Action and Search Report, Chinese Patent App. No. 201711429674.3 (dated Dec. 4, 2019).

Guo et al., "Smooth filtering of natural gamma energy spectrum," Journal of Daqing Petroleum Institute, vol. 27, No. 3, 4 pages (Sep. 2003).

Zhang et al., "Elemental Capture Spectroscopy Log Interpretation Method and Its Application," China Excellent Master Degree Thesis Database Basic Science Series, 78 pages (Feb. 28, 2017).

Natural Gas Industry, vol. 29, No. 6, Application of elementary-capture-spectroscopy log to the reservoir evaluation, pp. 43-45.

Computing Techniques for Geophysical and Geochemical Exploration, vol. 31, No. 2, The mineral content in volcanic rocks is inversed by ECS logging data, pp. 149-153.

English-language translation of Search Report (dated Nov. 27, 2017).

* cited by examiner

GAMMA RAY SPECTRUM UNFOLDING METHOD FOR ELEMENTAL CAPTURE SPECTROSCOPY LOGGING AND DEVICE THEREFOR

CROSS-REFERENCE TO RELATED APPLICATIONS

This application is a National Stage Application of PCT/CN2018/120083, filed Dec. 10, 2018, which claims the benefit of and priority to Chinese Patent Application No. 2017114296743, filed Dec. 26, 2017, both of which are incorporated herein by reference in their entireties.

TECHNICAL FIELD

The present invention relates to a gamma ray spectrum unfolding method for elemental capture spectroscopy logging and a device therefor, which belongs to the field of logging technology in the field of oil and gas exploration.

BACKGROUND

The Elemental Capture Spectroscopy (abbreviated as ECS) logging instrument is a formation element logging instrument newly marketed in China by Schlumberger Limited. Gamma ray spectra are obtained with this instrument by applying the principle of nuclear reaction between neutrons and formation nuclei, which spectra contain information on the primary rock-forming elements, Si, Ca, Fe, Al, S, Ti, H, Gd, and other elements in the stratum, providing a new approach for refined evaluation of complex reservoir lithology. The essence of the elemental capture spectrum logging interpretation lies in calibration of the original measured spectrum of the formation by using the standard spectrum of each element and obtaining the yield of various elements by unfolding. In the measured spectrum obtained by the elemental capture spectroscopy instrument, both the information on captured gamma ray and that on inelastic scattering are included. The information on captured gamma ray is most important for field interpretation and evaluation in oilfields, and therefore the influence of the inelastic scattering information on unfolding precision must be accounted for when unfolding the measured spectrum. At the same time, the interactions among various stratigraphic elements also limit the unfolding precision of neutron captured gamma ray spectroscopy.

Although researches have been carried out by previous researchers on the unfolding methods for elemental capture spectroscopy logging, these researches are mainly focused on numerical simulation and theoretical elaboration, but fails to provide an effective technical method for actual underground data and therefore cannot be applied in practical production.

SUMMARY

In order to solve the above technical problems, an object of the present disclosure is to provide a gamma ray spectrum unfolding method for elemental capture spectroscopy logging and a device therefor. The method is a method for unfolding the original measured spectrum obtained by an elemental capture spectroscopy logging instrument, and has the advantages of high precision and high operability.

In order to achieve the above object, the present disclosure provides a gamma ray spectrum unfolding method for elemental capture spectroscopy logging, which comprises the following steps:

Step 1: acquiring and analyzing research area data at least including elemental capture gamma ray spectroscopy logging data (also referred to as measured gamma ray spectrum, measured spectrum, measured mixed gamma ray spectrum, measured spectrum of total element gamma ray spectrum, and the like in the present disclosure) and whole rock oxides analysis data, and determining the primary types of elements in the area;

Step 2: preprocessing the elemental capture gamma ray spectroscopy logging data, including selection of energy window, energy spectrum smoothing and filtering, normalization, and inelastic scattering information deduction, to obtain a preprocessed elemental capture gamma ray spectrum;

Step 3: constructing a primary element group and an auxiliary element group composed of different elements, to determine an order of spectrum unfolding for different elements;

Step 4: according to the primary element group and the auxiliary element group obtained in step 3, first unfolding the primary elements in the elemental capture gamma ray spectrum preprocessed in Step 2 by using the least square method, deducting the contribution of all the primary elements from the elemental capture gamma ray spectrum preprocessed in Step 2 (i.e., the elemental capture gamma ray spectrum preprocessed in Step 2), and then unfolding the auxiliary elements by using the least square method, to obtain the relative yield of each element;

Step 5: according to the relative yield of each element obtained in Step 4, in combination with the normalized elemental capture standard gamma ray spectrum of single element (also referred to as single element standard spectrum in the present disclosure), reconstructing the elemental capture gamma ray spectrum and comparing the reconstructed gamma ray spectrum with the measured gamma ray spectrum, to determine whether the unfolding results are reliable.

According to a specific embodiment, preferably, in Step 1 of the above unfolding method, the acquired and analyzed research area data further comprises one or a combination of several of conventional logging data, logging data, and geological data.

According to a specific embodiment, preferably, in Step 1 of the above unfolding method, the primary element types in the research area are determined by analyzing the whole rock oxide analysis data, and optionally, one or a combination of several of conventional logging data, logging data, and geological data from the research area, determining the weight percentages of different kinds of oxides in the rock, and determining the primary types of elements in the area based on the weight percentage of each oxide. Here, the geological data mainly includes: core sheets and/or geological reports. The whole rock oxide analysis data are information necessary for determining the primary element types in the research area while possibly referring to one or more of the conventional logging data, logging data and geological data.

In the unfolding method, the gamma ray spectrum is preprocessed in Step 2, which can eliminate the influence of factors such as the wellbore environment, the inherent characteristics of the instrument and the like in the measuring process and improve the precision of spectrum unfolding.

In terms of energy window selection, the gamma ray energy detected by elemental capture spectroscopy logging generally concentrates at 0-10 MeV, which corresponds to channel addresses 0-255 with a total of 256 channels. The low-energy section tends to be influenced by factors such as the Compton platform effect and instrument noises to resulting in high counts, i.e., a large amount of interfering signals, which needs to be eliminated before unfolding. Moreover, in the high-energy section, the counts of energy spectra are often too low to have a substantial impact on the final solving results in the process of spectrum unfolding, which also needs to be eliminated before unfolding. If the data with adverse effects are not completely removed, they will affect the unfolding; however, if too many data are removed, useful information will get lost, which may also affect unfolding. Therefore, it is essential to choose an appropriate energy range which must be resolved before unfolding.

Figure 1:
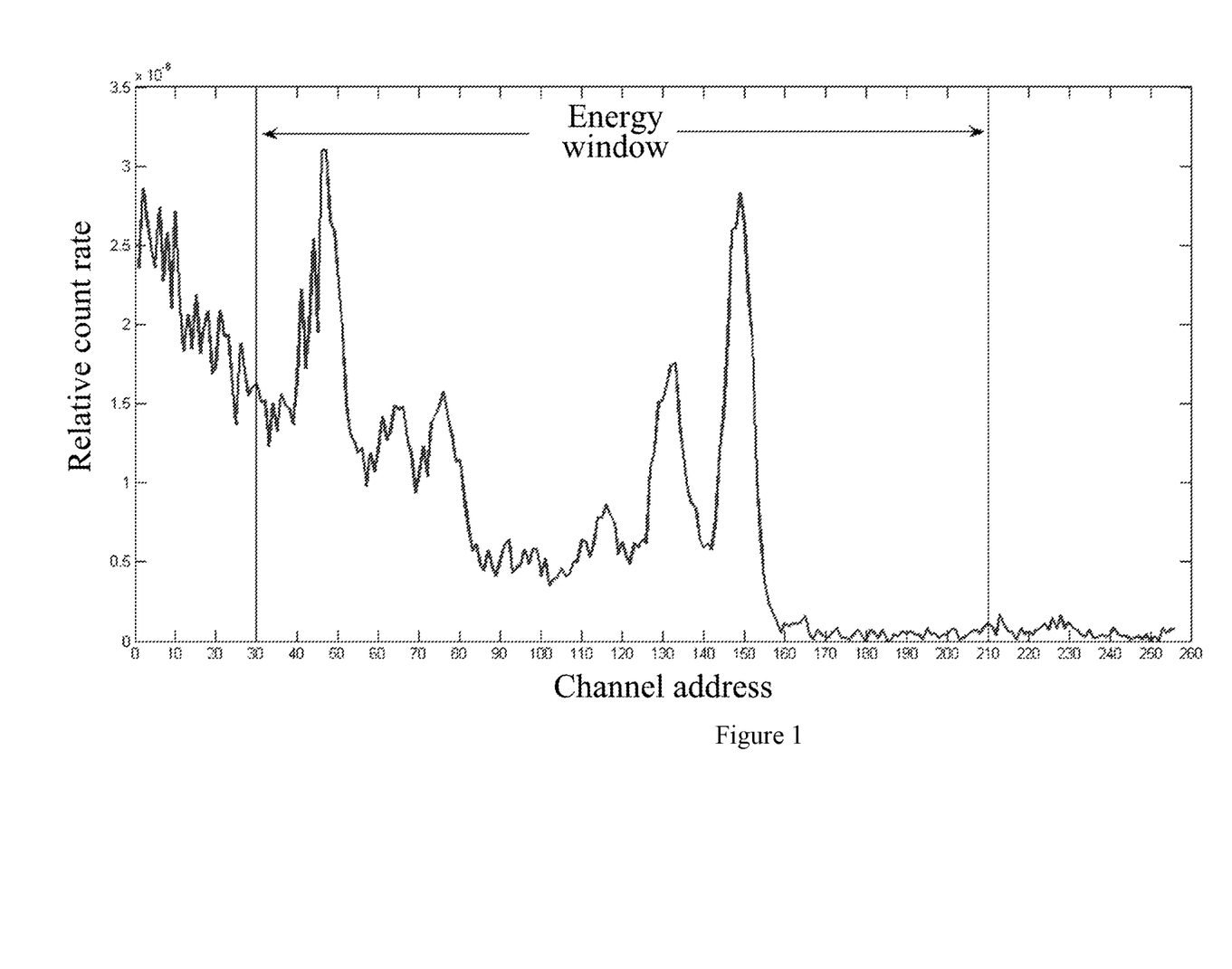
FIG. 1 shows a schematic diagram of the selection of the energy window for unfolding.

According to a specific embodiment, preferably, in Step 2 of the above unfolding method, the selected energy window ranges in channels 30-210. The basic principle of selecting the energy window for unfolding lies in that the energy corresponding to elemental whole energy peak is not to be removed. The Applicant has found the characteristic peak positions of various elements involved in the spectrum unfolding upon searching through the nuclear data published by the International Atomic Energy Agency (IAEA), and determined an energy window range for unfolding in view of the energy information corresponding to the peak positions. The peak positions of each element are ranked in energy, from low to high, as 1.38, 1.808, 1.924, 1.951, 2.073, 2.092, 2.223, 2.282, 2.379, 2.828, 3.033, 3.22, 3.539, 3.587, 3.691, 3.981, 4.419, 4.733, 4.737, 4.869, 4.933, 5.42, 5.9, 5.92, 6.018, 6.11, 6.36, 6.379, 6.395, 6.418, 6.42, 6.76, 7.414, 7.631, 7.646, 7.724, 7.769, 7.79, 8.153 (MeV). According to these data, the energy range of the energy window is taken as 1.2 MeV-8.4 MeV, and the corresponding energy window ranges in channels 30-210, as shown in FIG. 1.

According to a specific embodiment, preferably, in Step 2 of the above unfolding method, the energy spectrum smoothing and filtering is carried out using a Savitzky-Golay filter and the Savitzky-Golay five-point filtering method by filtering the elemental capture gamma ray spectroscopy logging data in the range of the selected energy window, and the equation for the Savitzky-Golay five-point filtering method is shown in Equation 1 as below:

$$\bar{y} = \frac{1}{35}(-3y_{i-2} + 12y_{i-1} + 17y_i + 12y_{i+1} - 3y_{i+2}) \quad \text{(Equation 1)}$$

wherein, $\bar{y}$ represents a count at an address after filtering, $y_i$ represents a count at said address, $y_{i-1}$ represents a count at the first address before said address, $y_{i-2}$ represents a count at the second address before said address, $y_{i+1}$ represents a count at the first address after said address, and $y_{i+2}$ represents a count at the second address after said address.

In the measuring process of the elemental capture gamma ray spectroscopy logging instrument, there is inherent statistical fluctuation, and energy spectrum smoothing and filtering can resolve the problems of false peaks and weak peaks in measuring gamma ray spectrum. With the Savitzky-Golay filter, the data from the measured gamma ray spectrum are fitted by using a polynomial within the window length of the filter and filtered results are obtained, that is, the corresponding value of the fitting polynomial at the filter point. Upon analysis of the originally measured gamma ray spectrum, glitches may be eliminated with the Savitzky-Golay five-point filtering method. The essence of the filtering method lies in weighted averaging of the measured data to average each data fluctuation in the energy spectrum data, and this averaging has little impact on data tendency and the average value of the fluctuation is zero, which can effectively eliminate the influence of statistical fluctuation.

According to a specific embodiment, preferably, in Step 2 of the above unfolding method, the normalization is carried out in a process where, with respect to the elemental capture gamma ray spectroscopy logging data having been subjected to energy window range selection and energy spectrum smoothing and filtering, the sum of the energy spectrum data of 181 channels (channel by channel) is taken as 10 to provide a normalized elemental capture gamma ray spectrum by using the equation as shown in Equation 2 below:

$$N_{Gkj} = \frac{N_{kj}}{\sum_{k=30}^{210} N_{kj}} k = 30, 31, \ldots, 210 \quad \text{(Equation 2)}$$

wherein, $N_{Gkj}$ is a count of the normalized elemental capture gamma ray spectrum in the $k^{th}$ channel corresponding to the j depth point, $N_{kj}$ is a count of the elemental capture gamma ray spectrum upon energy window range selection and energy spectrum smoothing and filtering in the $k^{th}$ channel corresponding to the j depth point, k is the channel address, and j is the depth point below the formation.

In a specific embodiment, the normalization is conducted by accumulating the energy spectrum counts of the entire energy segment, and then dividing the count of each channel by the sum of the counts corresponding to all the channel addresses in the energy window, so that the normalized data are between 0 and 10 and the sum of the energy spectrum data of the entire energy segment is 10. In the present disclosure, the normalization is conducted by normalizing the filtered gamma ray spectrum data in the energy window range to obtain normalized gamma ray spectrum data, so that the qualitatively calculated value of the captured element after normalization can accurately reflect the change in the whole well section. Therefore, the normalization process can guarantee the method of qualitative calculation and separation of elements, and can also accurately reflect the formation changes within the energy window range.

According to a specific embodiment, preferably, in Step 2 of the above unfolding method, the inelastic scattering information deduction is carried out in a process where the counts of three segments of the channel addresses of channels 30-54, 55-75, and 76-210 selected from the normalized elemental capture gamma ray spectrum are subjected to inelastic information deduction using a deduction coefficient of 0.9, 0.7, and 0.8, respectively. Since the gamma ray spectrum acquired by elemental capture spectroscopy logging contains both captured gamma ray information and inelastic scattering information, while the information on captured gamma ray is most important for field interpretation and evaluation in oilfields, the contribution of the inelastic scattering information to the measured spectrum of the total element gamma ray spectrum must be deducted in the stripping process performed on the measured spectrum, which can effectively improve the precision of subsequent unfolding. In a specific embodiment, a sectional deduction method is used for the process for inelastic scattering information deduction in the measured spectrum, and different deduction coefficients are used in different energy segments to cancel the influence of inelastic scattering information in the measured spectrum, in accordance with the contribution of different elements to the total count of different energy segments.

Figure 2:
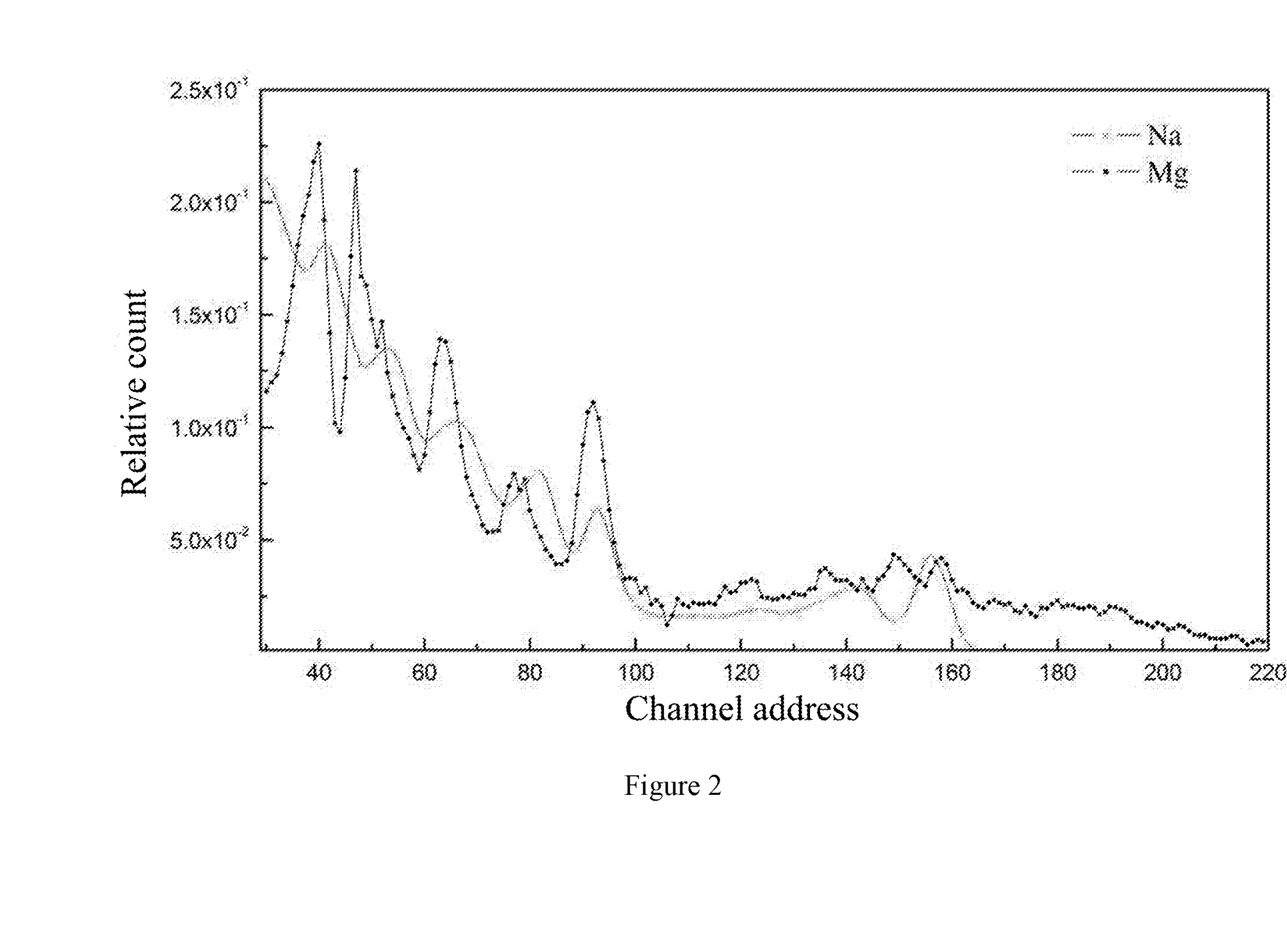
FIG. 2 shows a comparison diagram between the elemental capture standard gamma ray spectra of single element: the element Na and the element Mg.

According to a specific embodiment, preferably, in Step 3 of the above unfolding method, the primary element group constructed comprises one or more elements of Si, Ca, S, H, Cl, Ti, Fe, Na, Ba, and Gd, and the contribution of these elements accounts for more than 80% of the total element gamma ray spectrum; and the auxiliary element group constructed comprises one or more elements of Mg, K, Cr, Ni, I, Tb, and Al. The difference among the spectral shapes and the characteristic peak positions in the single element standard gamma ray spectra is the essence and key in spectrum unfolding for the elemental capture spectroscopy logging, but there are actually some similarities and overlapping amount different elements in terms of spectral shape and characteristic peak position distribution. As shown in FIG. 2, there is a certain similarity in spectral shape and an overlap in the channel address where the characteristic energy peaks are located between the element Na and the element Mg. Therefore, if the mutual influence factor between the elements are not considered in the practical unfolding process, the precision of the spectrum unfolding will be compromised, thereby affecting the accuracy of evaluation of the oil and gas reservoir. The element groups proposed are established on the basis of consideration of the mutual influence among single element standard gamma ray spectra of different elements. The primary element group mainly includes elements that constitute the rock skeleton part. The auxiliary element group is constructed to eliminate or assist in improving the precision of spectrum unfolding for other elements. The auxiliary elements Mg and K are mainly used to analyze and determine the yield of S, the auxiliary elements Mg, Cr, and Ni are used to analyze and determine the yields of the elements Si, Ca, and Fe, and the auxiliary elements Cr, Ni, I, Tb, and Al are used to analyze and determine the yields of the elements H, Gd, and Ti, so that the precision of unfolding is improved.

According to a specific embodiment, preferably, in Step 4 of the above unfolding method, the unfolding by using the least square method is performed according to a calculation as shown in the following Equation 3 to obtain the relative yield of each element:

$$c_i = \sum_{j=1}^{m} a_{ij} y_j + \varepsilon_i \quad \text{(Equation 3)}$$

wherein, $y_j$ is a relative yield of the $j^{th}$ element (i.e., the contribution of the element to the total count), $a_{ij}$ is a count of the normalized elemental capture standard gamma ray spectrum of single element of the $j^{th}$ element in the $i^{th}$ channel, $c_i$ is a count of the preprocessed elemental capture gamma ray spectrum in the $i^{th}$ channel, and $\varepsilon_i$ is a correction factor, where $\varepsilon_i \leq 0.1$.

In the present disclosure, after the primary element group is unfolded by using the above least square equation, the contribution of the primary elements is deducted from the preprocessed total element gamma ray spectrum, and the auxiliary element group is further unfolded by using the above least square equation, so that the yield information of each element in the primary and auxiliary element groups is gradually obtained, thereby effectively improving the precision of spectrum unfolding.

According to a specific embodiment, preferably, in Step 5 of the above unfolding method, the normalized elemental capture standard gamma ray spectrum of single element is obtained in a process where, with respect to the elemental capture standard gamma ray spectrum of single element, the sum of the energy spectrum data of 256 channels (channel by channel) is taken as 10 by using the equation as shown in Equation 4 below:

$$N_{Gkj} = \frac{N_{kj}}{\sum_{k=0}^{255} N_{kj}} k = 0, 1, \ldots, 255 \quad \text{(Equation 4)}$$

wherein, $N_{Gkj}$ is a count of the normalized elemental capture standard gamma ray spectrum of single element in the $k^{th}$ channel corresponding to the j depth point, $N_{kj}$ is a count of the elemental capture standard gamma ray spectrum of single element before normalization in the $k^{th}$ channel corresponding to the j depth point, k is the channel address, and j is the depth point below the formation.

According to a specific embodiment, preferably, in Step 5 of the above unfolding method, reconstructing the elemental capture gamma ray spectrum comprises calculating the count of the reconstructed gamma ray spectrum in the $i^{th}$ channel (i.e., the count of all unfolded elements in the $i^{th}$ channel) according to the following Equation 5 to obtain the count in each channel, and plotting the reconstructed gamma ray spectrum:

$$X_i = \sum_{j=1}^{m} a_{ij} y_j + \varepsilon_i \quad \text{(Equation 5)}$$

wherein, $X_i$ is a count of the reconstructed gamma ray spectrum in the $i^{th}$ channel, $y_j$ is a relative yield of the $j^{th}$ element (calculated from Equation 3), and $a_{ij}$ is a count of the normalized elemental capture standard gamma ray spectrum of single element of the $j^{th}$ element in the $i^{th}$ channel (calculated from Equation 4), and $\varepsilon_i$ is a correction factor, where $\varepsilon_i \leq 0.1$.

According to a specific embodiment, preferably, in Step 5 of the above unfolding method, comparing the reconstructed gamma ray spectrum with the measured gamma ray spectrum is carried out according to Equation 6:

$$|c_i - X_i|/|C_i - X_i| \ll \varepsilon \quad \text{(Equation 6)}$$

$c_i$ is a count of the measured gamma ray spectrum in the $i^{th}$ channel, $X_i$ is a count of the reconstructed gamma ray spectrum in the $i^{th}$ channel, and $\varepsilon$ is the relative error; and when the relative error is less than or equal to 5%, the unfolding results are regarded as reliable; when the relative error is greater than 5%, the unfolding results are regarded as unreliable.

In a specific embodiment, in the process of reconstructing gamma ray spectrum, with reference to a stripping analysis method, the measured mixed gamma ray spectrum is regarded as a linear combination of single elements; the contents of formation elements are determined on the basis of the obtained single element standard spectrum database, reconstruction is carried out according to the results of known captured and inelastic scattering element yields, and the gamma ray spectrum practically measured is compared with the reconstructed gamma ray spectrum to determine whether the unfolding results are reliable, so that the precision of spectrum unfolding is controlled.

The present disclosure also provides a gamma ray spectrum unfolding device for elemental capture spectroscopy logging, including a module for acquiring data and determining the primary element types, configured to acquire and analyze research area data at least including elemental capture gamma ray spectroscopy logging data and whole rock oxide analysis data, in order to determine the primary types of elements in the area; a module for preprocessing the elemental capture gamma ray spectroscopy logging data, configured to preprocess the elemental capture gamma ray spectroscopy logging data, including selection of energy window, energy spectrum smoothing and filtering, normalization, and inelastic scattering information deduction, in order to obtain a preprocessed elemental capture gamma ray spectrum; a module for constructing a primary element group and an auxiliary element group, configured to construct a primary element group and an auxiliary element group composed of different elements, in order to determine an order of spectrum unfolding for different elements; a module for unfolding with the least square method on the basis of element groups, configured to, according to the primary element group and the auxiliary element group, firstly unfold the primary elements in the preprocessed elemental capture gamma ray spectrum by using the least square method, deduct the contribution of all the primary elements from the preprocessed total elemental capture gamma ray spectrum (i.e., the preprocessed elemental capture gamma ray spectrum), and then unfold the auxiliary elements by using the least square method, thereby obtaining the relative yield of each element; and a module for reconstructing gamma ray spectrum and error control, configured to reconstruct the elemental capture gamma ray spectrum according to the relative yield of each element in combination with the normalized elemental capture standard gamma ray spectrum of single element, and compare the reconstructed gamma ray spectrum with the measured gamma ray spectrum to determine whether the unfolding results are reliable.

In the above device, preferably, in the module for acquiring data and determining the primary element types, the acquired and analyzed research area data further comprises one or a combination of several of conventional logging data, logging data, and geological data.

In the above device, preferably, in the module for acquiring data and determining the primary element types, the primary element types in the research area are determined by analyzing the whole rock oxide analysis data, and optionally, one or a combination of several of conventional logging data, logging data, and geological data from the research area, determining the weight percentages of different kinds of oxides in the rock, and determining the primary types of elements in the area based on the weight percentage of each oxide.

In the above device, preferably, in the module for preprocessing elemental capture gamma ray spectroscopy logging data, the selected energy window range is channels 30-210.

In the above device, preferably, in the module for preprocessing the elemental capture gamma ray spectroscopy logging data, the energy spectrum smoothing and filtering is carried out using a Savitzky-Golay filter and the Savitzky-Golay five-point filtering method by filtering the elemental capture gamma ray spectroscopy logging data in the range of the selected energy window, and the equation for the Savitzky-Golay five-point filtering method is shown in Equation 1 as below:

$$\bar{y} = \frac{1}{35}(-3y_{i-2} + 12y_{i-1} + 17y_i + 12y_{i+1} - 3y_{i+2}) \quad \text{(Equation 1)}$$

wherein, $\bar{y}$ represents a count at an address after filtering, $y_i$ represents a count at said address, $y_{i-1}$ represents a count at the first address before said address, $y_{i-1}$ represents a count at the second address before said address, $y_{i+1}$ represents a count at the first address after said address, and $y_{i+2}$ represents a count at the second address after said address.

In the above device, preferably, in the module for preprocessing elemental capture gamma ray spectroscopy logging data, the normalization is carried out in a process where, with respect to the elemental capture gamma ray spectroscopy logging data having been subjected to energy window range selection and energy spectrum smoothing and filtering, the sum of the energy spectrum data of 181 channels (channel by channel) is taken as 10 to provide a normalized elemental capture gamma ray spectrum by using the equation as shown in Equation 2 below:

$$N_{Gkj} = \frac{N_{kj}}{\sum_{k=30}^{210} N_{kj}} k = 30, 31, \ldots, 210 \quad \text{(Equation 2)}$$

wherein, $N_{Gkj}$ is a count of the normalized elemental capture gamma ray spectrum in the $k^{th}$ channel corresponding to the j depth point, $N_{kj}$ is a count of the elemental capture gamma ray spectrum upon energy window range selection and energy spectrum smoothing and filtering in the $k^{th}$ channel corresponding to the j depth point, k is the channel address, and j is the depth point below the formation.

In the above device, preferably, in the module for preprocessing elemental capture gamma ray spectroscopy logging data, the inelastic scattering information deduction is carried out in a process where the counts of three segments of the channel addresses of channels 30-54, 55-75, and 76-210 selected from the normalized elemental capture gamma ray spectrum are subjected to inelastic information deduction using a deduction coefficient of 0.9, 0.7, and 0.8, respectively.

In the above device, preferably, in the module for constructing a primary element group and an auxiliary element group, the primary element group constructed comprises one or more elements of Si, Ca, S, H, Cl, Ti, Fe, Na, Ba, and Gd; the auxiliary element group constructed comprises one or more elements of Mg, K, Cr, Ni, I, Tb, and Al.

In the above device, preferably, in the module for unfolding with the least square method on the basis of element groups, the unfolding by using the least square method is performed according to a calculation as shown in the following Equation 3 to obtain the relative yield of each element:

$$c_i = \sum_{j=1}^{m} a_{ij} y_j + \varepsilon_i \quad \text{(Equation 3)}$$

wherein, $y_j$ is a relative yield of the $j^{th}$ element (i.e., the contribution of the element to the total count), $a_{ij}$ is a count of the normalized elemental capture standard gamma ray spectrum of single element of the $j^{th}$ element in the $i^{th}$ channel, $c_i$ is a count of the preprocessed elemental capture gamma ray spectrum in the $i^{th}$ channel, and $\varepsilon_i$ is a correction factor, where $\varepsilon_i \le 0.1$.

In the above device, preferably, in the module for reconstructing gamma ray spectrum and error control, the normalized elemental capture standard gamma ray spectrum of single element is obtained in a process where, with respect to the elemental capture standard gamma ray spectrum of single element, the sum of the energy spectrum data of 256 channels (channel by channel) is taken as 10 by using the equation as shown in Equation 4 below:

$$N_{Gkj} = \frac{N_{kj}}{\sum_{k=0}^{255} N_{kj}} \quad \text{(Equation 4)}$$

$$k = 0, 1, \ldots, 255$$

wherein, $N_{Gkj}$ is a count of the normalized elemental capture standard gamma ray spectrum of single element in the $k^{th}$ channel corresponding to the j depth point, $N_{kj}$ is a count of the elemental capture standard gamma ray spectrum of single element before normalization in the $k^{th}$ channel corresponding to the j depth point, k is the channel address, and j is the depth point below the formation.

In the above device, preferably, in the module for reconstructing gamma ray spectrum and error control, reconstructing the elemental capture gamma ray spectrum comprises calculating the count of the reconstructed gamma ray spectrum in the $i^{th}$ channel (i.e., the count of all the unfolded elements in the $i^{th}$ channel) according to the following Equation 5 to obtain the count in each channel, and plotting the reconstructed gamma ray spectrum:

$$X_i = \sum_{j=1}^{m} a_{ij} y_j + \varepsilon_i \quad \text{(Equation 5)}$$

wherein, $X_i$ is a count of the reconstructed gamma ray spectrum in the $i^{th}$ channel, $y_j$ is a relative yield of the $j^{th}$ element (calculated from Equation 3), and $a_{ij}$ is a count of the normalized elemental capture standard gamma ray spectrum of single element of the $j^{th}$ element in the $i^{th}$ channel (calculated from Equation 4), and $\varepsilon_i$ is a correction factor, where $\varepsilon_i \le 0.1$.

In the above device, preferably, in the module for reconstructing gamma ray spectrum and error control, comparing the reconstructed gamma ray spectrum with the measured gamma ray spectrum is carried out according to Equation 6:

$$|c_i - X_i|/|C_i - X_i| \le \varepsilon \quad \text{(Equation 6)}$$

$c_i$ is a count of the measured gamma ray spectrum in the $i^{th}$ channel, $X_i$ is a count of the reconstructed gamma ray spectrum in the $i^{th}$ channel, and $\varepsilon$ is the relative error; and when the relative error is less than or equal to 5%, the unfolding results are regarded as reliable; when the relative error is greater than 5%, the unfolding results are regarded as unreliable.

An in-depth study has been conducted on the method of processing elemental capture gamma ray spectroscopy logging data in the present disclosure, and a method and device for unfolding the gamma ray spectrum resulted from an elemental capture spectroscopy logging instrument with high precision and operability are subsequently provided, which brings an excellent technical means for accurately operation of elemental capture energy spectrum unfolding. In the present disclosure, gamma ray spectrum data acquired by an elemental capture spectroscopy logging instrument are first preprocessed, and the influence of factors such as the wellbore environment and the inherent characteristics of the instrument in the measuring process are eliminated. Then, for the first time, on the basis of the consideration of the interactions among different elements, an idea of unfolding neutron capture gamma ray spectrum based on element groups and a specific implementation method are proposed. With the theoretical analysis and numerical calculation of the spectral shapes, the characteristic peak channels and the background of different elements, a primary element group and an auxiliary element group are constructed according to the degree of interactions among the elements, and the order of spectrum unfolding for different elements is clarified for the first time. Further, a method for unfolding neutron capture gamma ray spectrum based on element groups is implemented for the first time on basis of the least square method, the energy spectrum is reconstructed according to the yield of each element obtained by unfolding with the least square method, and the actually measured gamma ray spectrum is compared with the reconstructed gamma ray spectrum for error control, which effectively improves the precision of spectrum unfolding. Field application in oilfields shows that the unfolding method and device of the present disclosure have good universality for different types of reservoirs, and at the same time, provide an important and significant reference in the processing of neutron gamma ray spectrum data when using other types of instruments.

DETAILED DESCRIPTION

In order to provide a clearer understanding of the technical features, the objects and the advantages of the present disclosure, detailed description of the technical solutions of the present disclosure will be made hereinafter in conjunction with the practical field application examples in oilfields, which is not to be construed as limitation to the scope of the present disclosure.

Example 1

This example provides a gamma ray spectrum unfolding method for elemental capture spectroscopy logging, which may comprise the following steps:

1. Acquirement of the measured spectrums of total elemental gamma ray spectroscopy and determination of the distribution of primary elements in the research area A DAS3 well in the Daqing Oilfield in the reservoir section 3230-3270 m was logged by using an elemental capture energy spectrum logging instrument, and the total gamma ray spectrum of the stratigraphic elements at each depth point was acquired, that is, the elemental capture gamma ray spectroscopy logging data, with each depth point corresponding to one spectrum. The whole rock oxide analysis experiment results and logging data of the DAS3 well in the Daqing Oilfield were acquired and analyzed, and it was found that the reservoir section 3230 m-3270 m primarily comprised the elements Si, Ca, Al, Fe, S, K, Na, Mg, Ti, Gd, H, and Ba, with the oxides of these elements accounting for 98.9% by weight of the content of rock.

2. Preprocessing of the elemental capture gamma ray spectroscopy data

The measured spectra at various depth points in the DAS3 well reservoir section 3230-3270 m were respectively pre-processed, and the preprocessed elemental capture gamma ray spectrum corresponding to each depth point was obtained respectively, wherein the preprocessing included selection of energy window, energy spectrum smoothing and filtering, normalization, and inelastic scattering information deduction.

Here, the selected energy window range was channels 30-210, as shown in FIG. 1.

The energy spectrum smoothing and filtering was carried out using a Savitzky-Golay filter and the Savitzky-Golay five-point filtering method by filtering the measured spectrum in the range of the selected energy window. The equation for the Savitzky-Golay five-point filtering method is shown in Equation 1 as below:

$$\bar{y} = \frac{1}{35}(-3y_{i-2} + 12y_{i-1} + 17y_i + 12y_{i+1} - 3y_{i+2}) \quad \text{(Equation 1)}$$

wherein, $\bar{y}$ represents a count at an address after filtering, $y_i$ represents a count at said address, $y_{i-1}$ represents a count at the first address before said address, $y_{i-2}$ represents a count at the second address before said address, $y_{i+1}$ represents a count at the first address after said address, and $y_{i+2}$ represents a count at the second address after said address.

The normalization was carried out in a process where, with respect to the measured spectrum having been subjected to energy window range selection and energy spectrum smoothing and filtering, the sum of the energy spectrum data of 181 channels (channel by channel) was taken as 10 to provide a normalized measured spectrum by using the equation as shown in Equation 2 below:

$$N_{Gkj} = \frac{N_{kj}}{\sum_{k=30}^{210} N_{kj}} \quad \text{(Equation 2)}$$

$k = 30, 31, \ldots, 210$ wherein, $N_{Gkj}$ was a count of the normalized measured spectrum in the $k^{th}$ channel corresponding to the j depth point, $N_{kj}$ was a count of the measured spectrum upon energy window range selection and energy spectrum smoothing and filtering in the $k^{th}$ channel corresponding to the j depth point, k was the channel address, and j was the depth point below the formation.

The inelastic scattering information deduction was carried out in a process where the counts of three segments of the channel addresses of channels 30-54, 55-75, and 76-210 selected from the normalized measured spectrum were subjected to inelastic information deduction using a deduction coefficient of 0.9, 0.7, and 0.8, respectively.

3. Construction of the primary element group and the auxiliary element group

Based on Step 1, it was acknowledged that the primary element types in the DAS3 well reservoir section 3230 m-3270 m were Si, Ca, Al, Fe, S, K, Na, Mg, Ti, Gd, H, and Ba. A primary element group was constructed on the basis thereof, comprising: Si, Ca, S, Ti, Fe, Na, and Gd. In the construction of the auxiliary element group, the influence of the instrument background was taken into account, and the element Tb was included so that the auxiliary element group was constructed as: Mg, K, Al, and Tb.

4. Spectrum unfolding with the least square method based on element groups

Based on the primary element group and the auxiliary element group determined in Step 3, in the elemental capture gamma ray spectrum preprocessed in Step 2, the primary elements (i.e., Si, Ca, S, Ti, Fe, Na, H, Ba, and Gd) were first unfolded by using the least square method, and then the contribution of all the primary elements was deducted from the preprocessed total element gamma ray spectrum (i.e., the elemental capture gamma ray spectrum preprocessed in Step 2); the auxiliary elements (i.e., Mg, K, Al, and Tb) were unfolded by using the least square method, so that the relative yield of each element was determined.

The unfolding with the least square method was performed according to a calculation shown in the following Equation 3 so as to obtain the relative yield of each element:

$$c_i = \sum_{j=1}^{m} a_{ij} y_j + \varepsilon_i \quad \text{(Equation 3)}$$

wherein, $y_j$ is a relative yield of the $j^{th}$ element (i.e., the contribution of the element to the total count), $a_{ij}$ is a count of the normalized elemental capture standard gamma ray spectrum of single element of the $j^{th}$ element in the $i^{th}$ channel, $c_i$ is a count of the preprocessed elemental capture gamma ray spectrum in the $i^{th}$ channel, and $\varepsilon_i$ is a correction factor, where $\varepsilon_i \leq 0.1$.

Figure 3:
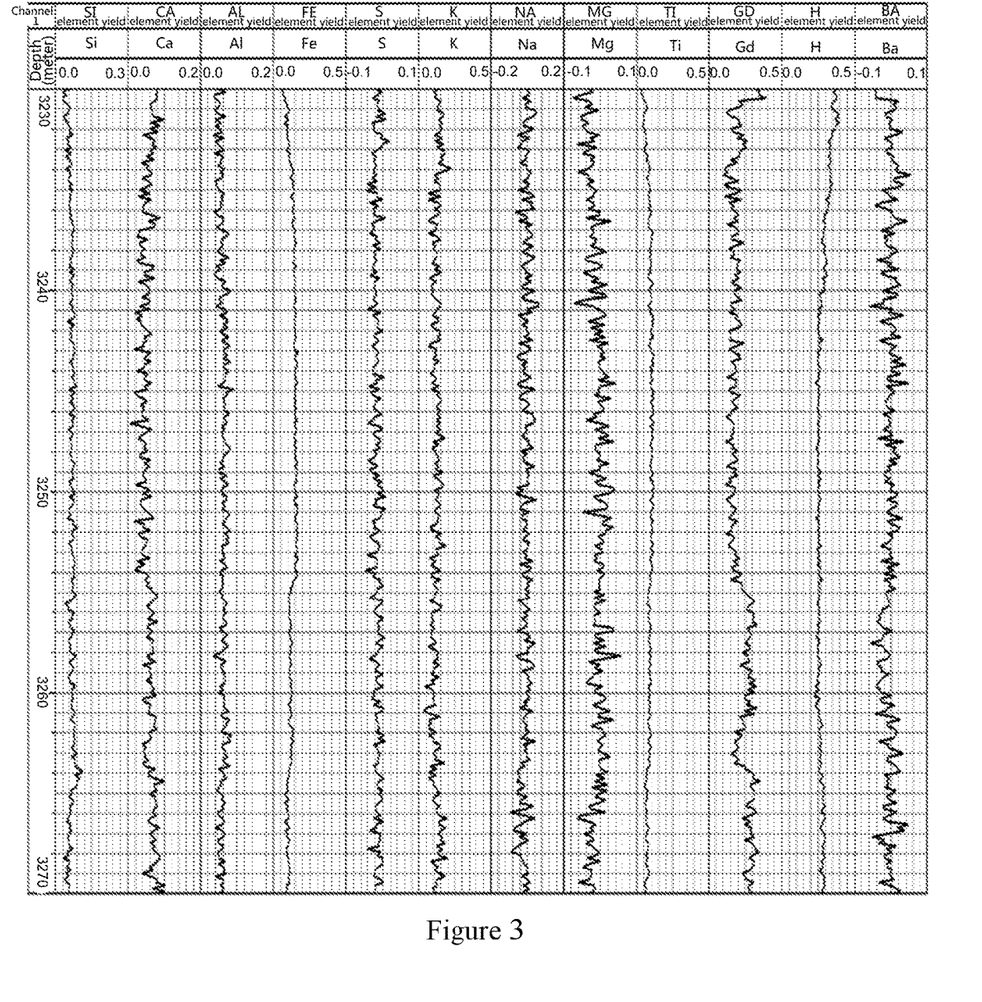
FIG. 3 shows the unfolding effects for each element in a DAS3 well at 2403.1956 m.

Taking the elemental capture gamma ray spectrum obtained at the depth point of 2403.1956 m in the DAS3 well as an example, the relative yield of each element obtained by unfolding was shown in FIG. 3. Since Td was background yield with no reference value, it was not shown in FIG. 3.

5. Reconstruction of the gamma ray spectrum and error control

According to the relative yield of each element obtained in Step 4 in combination with the normalized elemental capture standard gamma ray spectrum of single element, the elemental capture gamma ray spectrum was reconstructed, and the reconstructed gamma ray spectrum was compared with the measured gamma ray spectrum to determine whether the unfolding results were reliable.

Here, the normalized elemental capture standard gamma ray spectrum of single element was obtained in a process where, with respect to the elemental capture standard gamma ray spectrum of single element, the sum of the energy spectrum data of 256 channels (channel by channel) was taken as 10 by using the equation as shown in Equation 4 below:

$$N_{Gkj} = \frac{N_{kj}}{\sum_{k=0}^{255} N_{kj}}$$

$$k = 0, 1, \ldots, 255$$

(Equation 4)

wherein, $N_{Gkj}$ was a count of the normalized elemental capture standard gamma ray spectrum of single element in the $k^{th}$ channel corresponding to the j depth point, $N_{kj}$ was a count of the elemental capture standard gamma ray spectrum of single element before normalization in the $k^{th}$ channel corresponding to the j depth point, k was the channel address, and j was the depth point below the formation.

Because the count of the first two channel addresses was considered practically meaningless, the elemental capture standard gamma ray spectrum of single element could also be normalized by using the following Equation 4-1:

$$N_{Gkj} = \frac{N_{kj}}{\sum_{k=2}^{255} N_{kj}}$$

$$k = 2, 3, \ldots, 255.$$

(Equation 4-1)

The reconstruction of the elemental capture gamma ray spectrum was carried out by calculating the count of the reconstructed gamma ray spectrum in the $i^{th}$ channel (i.e., the count of all unfolded elements in the $i^{th}$ channel) according to the following Equation 5 to obtain the count in each channel, and then plotting the reconstructed gamma ray spectrum:

$$X_i = \sum_{j=1}^{m} a_{ij} y_j + \varepsilon_i$$

(Equation 5)

wherein, $X_i$ was a count of the reconstructed gamma ray spectrum in the $i^{th}$ channel, $y_j$ was a relative yield of the $j^{th}$ element (calculated from Equation 3), and $a_{ij}$ was a count of the normalized elemental capture standard gamma ray spectrum of single element of the $j^{th}$ element in the $i^{th}$ channel (calculated from Equation 4), and $\varepsilon_i$ was a correction factor, where $\varepsilon_i \leq 0.1$.

The comparison between the reconstructed gamma ray spectrum with the measured gamma ray spectrum was performed according to Equation 6:

$$|c_i - X_i|/|C_i - X_i| \leq \varepsilon$$

(Equation 6)

$c_i$ was a count of the measured gamma ray spectrum in the $i^{th}$ channel, $X_i$ was a count of the reconstructed gamma ray spectrum in the $i^{th}$ channel, and $\varepsilon$ was the relative error; and when the relative error was less than or equal to 5%, the unfolding results were regarded as reliable; when the relative error was greater than 5%, the unfolding results were regarded as unreliable.

Figure 4:
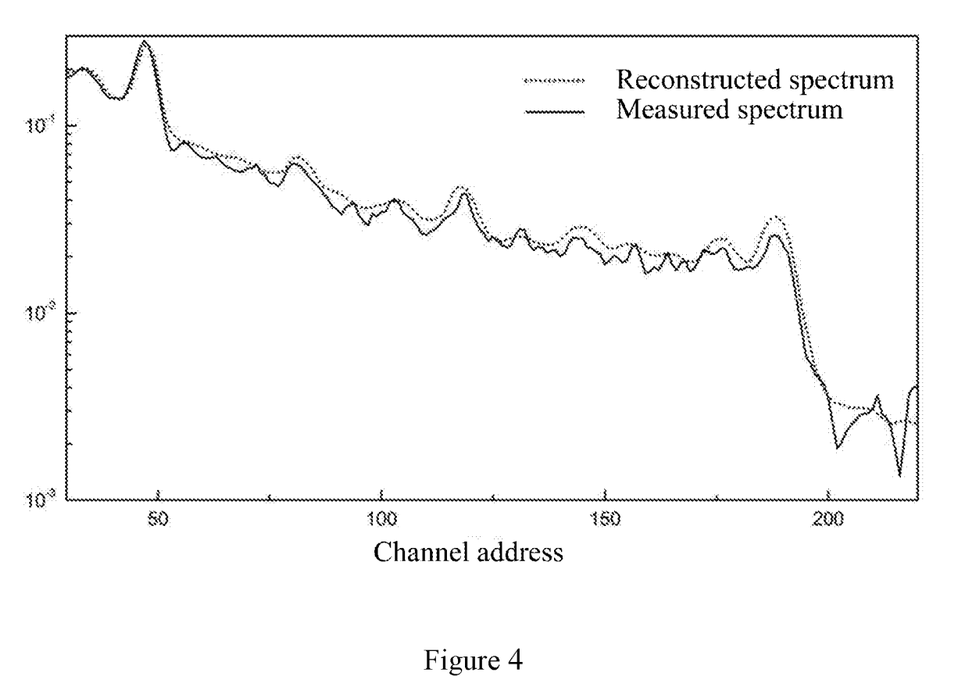
FIG. 4 shows a comparison diagram of the reconstructed gamma ray spectrum and the measured gamma ray spectrum of the DAS3 well at 2403.1956 m.
Figure 5:
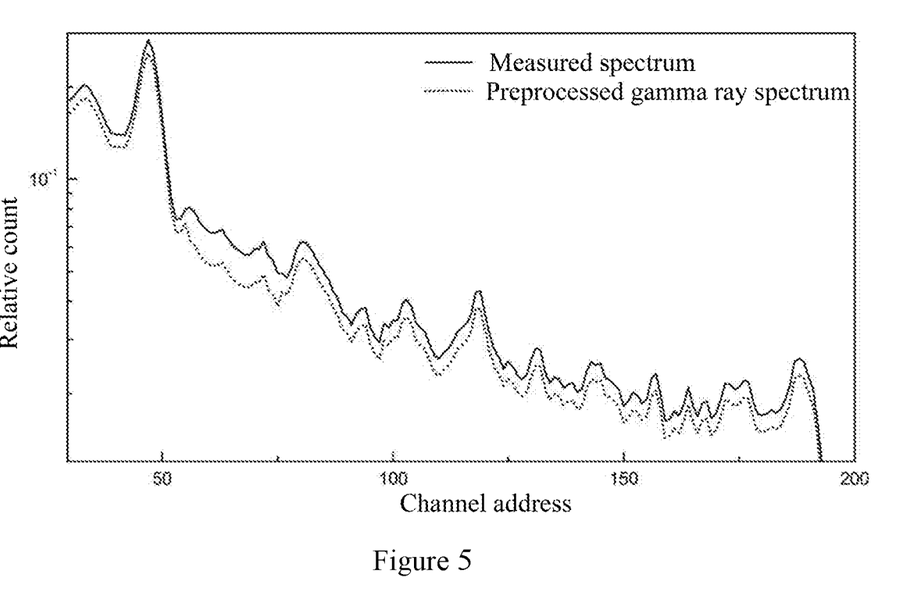
FIG. 5 shows a comparison diagram of the preprocessed elemental capture gamma ray spectrum and the measured gamma ray spectrum of the DAS3 well at 2403.1956 m.
Figure 6:
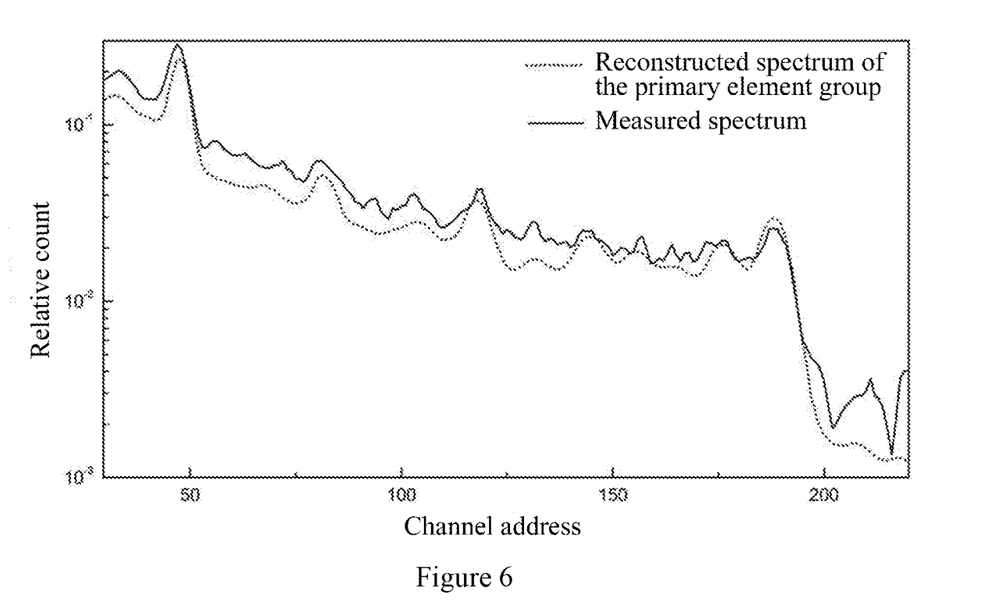
FIG. 6 shows a comparison diagram of the reconstructed gamma ray spectrum of the primary element group and the measured gamma ray spectrum of the DAS3 well at 2403.1956 m.

Taking the unfolding results of the elements at the depth point of 2403.1956 m in the DAS3 well as an example, the reconstructed gamma ray spectrum and the measured gamma ray spectrum (FIG. 4), the preprocessed elemental capture gamma ray spectrum and the measured gamma ray spectrum (FIG. 5), the reconstructed gamma ray spectrum of the primary element group (that is, the gamma ray spectrum reconstructed after the count of each channel was determined by calculating the count of all the primary elements in the $i^{th}$ channel according to Equation 5) and the measured gamma ray spectrum (FIG. 6) were compared. As can be seen from FIGS. 4-6, the unfolding results of this example were reliable, and the unfolding method was precise and effective.

Example 2

Figure 7:
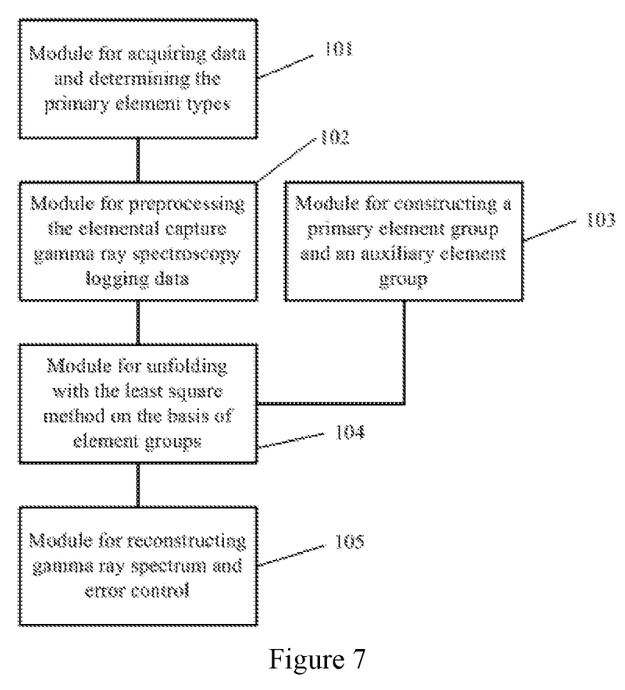
FIG. 7 shows a schematic diagram of a gamma ray spectrum unfolding device for elemental capture spectroscopy logging provided in Example 2.

This example provided a gamma ray spectrum unfolding device for elemental capture spectroscopy logging, as shown in FIG. 7, including a module 101 for acquiring data and determining the primary element types, configured to acquire and analyze research area data at least including elemental capture gamma ray spectroscopy logging data and whole rock oxide analysis data, in order to determine the primary types of elements in the area; a module 102 for preprocessing the elemental capture gamma ray spectroscopy logging data, configured to preprocess the elemental capture gamma ray spectroscopy logging data, including selection of energy window, energy spectrum smoothing and filtering, normalization, and inelastic scattering information deduction, in order to obtain a preprocessed elemental capture gamma ray spectrum; a module 103 for constructing a primary element group and an auxiliary element group, configured to construct a primary element group and an auxiliary element group composed of different elements, in order to determine an order of spectrum unfolding for different elements; a module 104 for unfolding with the least square method on the basis of element groups, configured to, according to the primary element group and the auxiliary element group, firstly unfold the primary elements in the preprocessed elemental capture gamma ray spectrum by using the least square method, deduct the contribution of all the primary elements from the preprocessed total elemental capture gamma ray spectrum (i.e., the preprocessed elemental capture gamma ray spectrum), and then unfold the auxiliary elements by using the least square method, thereby obtaining the relative yield of each element; and a module 105 for reconstructing gamma ray spectrum and error control, configured to reconstruct the elemental capture gamma ray spectrum according to the relative yield of each element in combination with the normalized elemental capture standard gamma ray spectrum of single element, and compare the reconstructed gamma ray spectrum with the measured gamma ray spectrum to determine whether the unfolding results were reliable.

The invention claimed is:

1. A gamma ray spectrum unfolding method for elemental capture spectroscopy logging, comprising the following steps:
   Step 1: acquiring and analyzing research area data at least including elemental capture gamma ray spectroscopy logging data and whole rock oxides analysis data, and determining the primary types of elements in the area;
   Step 2: preprocessing the elemental capture gamma ray spectroscopy logging data, including selection of energy window, energy spectrum smoothing and filtering, normalization, and inelastic scattering information deduction, to obtain a preprocessed elemental capture gamma ray spectrum;

Step 3: constructing a primary element group and an auxiliary element group composed of different elements, to determine an order of spectrum unfolding for different elements;

Step 4: according to the primary element group and the auxiliary element group obtained in step 3, first unfolding the primary elements in the elemental capture gamma ray spectrum preprocessed in Step 2 by using the least square method, deducting the contribution of all the primary elements from the elemental capture gamma ray spectrum preprocessed in Step 2, and then unfolding the auxiliary elements by using the least square method, to obtain the relative yield of each element;

Step 5: according to the relative yield of each element obtained in Step 4, in combination with the normalized elemental capture standard gamma ray spectrum of single element, reconstructing the elemental capture gamma ray spectrum and comparing the reconstructed gamma ray spectrum with the measured gamma ray spectrum, to determine whether the unfolding results are reliable.

2. The unfolding method according to claim 1, wherein, in Step 1, the acquired and analyzed research area data further include one or a combination of more of conventional logging data, logging data, and geological data; and the types of the primary elements in the research area are determined by: analyzing the whole rock oxides analysis data and optionally, one or a combination of more of conventional logging data, logging data, and geological data from the research area, determining the weight percentages of different kinds of oxides in the rock, and determining the primary types of elements in the area based on the weight percentage of each oxide.

3. The unfolding method according to claim 1, wherein, in Step 2, the energy window selected ranges in channels 30-210.

4. The unfolding method according to claim 1, wherein, in Step 2, the energy spectrum smoothing and filtering is carried out using a Savitzky-Golay filter and the Savitzky-Golay five-point filtering method by filtering the elemental capture gamma ray spectroscopy logging data in the range of the selected energy window, and the equation for the Savitzky-Golay five-point filtering method is shown in Equation 1 as below:

$$\bar{y} = \frac{1}{35}(-3y_{i-2} + 12y_{i-1} + 17y_i + 12y_{i+1} - 3y_{i+2}) \quad \text{(Equation 1)}$$

wherein, $\bar{y}$ represents a count at an address after filtering, $y_i$ represents a count at said address, $y_{i-1}$ represents a count at the first address before said address, $y_{i-2}$ represents a count at the second address before said address, $y_{i+1}$ represents a count at the first address after said address, and $y_{i+2}$ represents a count at the second address after said address.

5. The unfolding method according to claim 1, wherein in Step 2, the normalization is carried out in a process where, with respect to the elemental capture gamma ray spectroscopy logging data having been subjected to energy window range selection and energy spectrum smoothing and filtering, the sum of the energy spectrum data of 181 channels is taken as 10 to provide a normalized elemental capture gamma ray spectrum by using the equation as shown in Equation 2 below:

$$N_{Gkj} = \frac{N_{kj}}{\sum_{k=30}^{210} N_{kj}} \quad \text{(Equation 2)}$$

$k = 30, 31, \ldots, 210$ wherein, $N_{Gkj}$ is a count of the normalized elemental capture gamma ray spectrum in the $k^{th}$ channel corresponding to the j depth point, $N_{kj}$ is a count of the elemental capture gamma ray spectrum upon energy window range selection and energy spectrum smoothing and filtering in the $k^{th}$ channel corresponding to the j depth point, k is the channel address, and j is the depth point below the formation.

6. The unfolding method according to claim 1, wherein, in Step 2, the inelastic scattering information deduction is carried out in a process where the counts of three segments of the channel addresses of channels 30-54, 55-75, and 76-210 selected from the normalized elemental capture gamma ray spectrum are subjected to inelastic information deduction using a deduction coefficient of 0.9, 0.7, and 0.8, respectively.

7. The unfolding method according to claim 1, wherein, in Step 3, the primary element group constructed comprises one or more elements of Si, Ca, S, H, Cl, Ti, Fe, Na, Ba, and Gd; and the auxiliary element group constructed comprises one or more elements of Mg, K, Cr, Ni, I, Tb, and Al.

8. The unfolding method according to claim 1, wherein, in Step 4, the unfolding by using the least square method is performed according to a calculation as shown in the following Equation 3 to obtain the relative yield of each element:

$$c_i = \sum_{j=1}^{m} a_{ij} y_j + \varepsilon_i \quad \text{(Equation 3)}$$

wherein, $y_j$ is a relative yield of the $j^{th}$ element, $a_{ij}$ is a count of the normalized elemental capture standard gamma ray spectrum of single element of the $j^{th}$ element in the $i^{th}$ channel, $c_i$ is a count of the preprocessed elemental capture gamma ray spectrum in the $i^{th}$ channel, and $\varepsilon_i$ is a correction factor, where $\varepsilon_i \leq 0.1$.

9. The unfolding method according to claim 8, wherein, in Step 5, the normalized elemental capture standard gamma ray spectrum of single element is obtained in a process where, with respect to the elemental capture standard gamma ray spectrum of single element, the sum of the energy spectrum data of 256 channels is taken as 10 by using the equation as shown in Equation 4 below:

$$N_{Gkj} = \frac{N_{kj}}{\sum_{k=0}^{255} N_{kj}} \quad \text{(Equation 4)}$$

$k = 0, 1, \ldots, 255$ wherein, $N_{Gkj}$ is a count of the normalized elemental capture standard gamma ray spectrum of single element in the $k^{th}$ channel corresponding to the j depth point, $N_{kj}$ is a count of the elemental capture standard gamma ray spectrum of single element before normalization in the $k^{th}$ channel corresponding to the j depth point, k is the channel address, and j is the depth point below the formation.

10. The unfolding method according to claim 1, wherein, in Step 5, reconstructing the elemental capture gamma ray spectrum comprises calculating the count of the reconstructed gamma ray spectrum in the $i^{th}$ channel according to the following Equation 5 to obtain the count in each channel, and plotting the reconstructed gamma ray spectrum:

$$X_i = \sum_{j=1}^{m} a_{ij} y_j + \varepsilon_i \quad \text{(Equation 5)}$$

wherein, $X_i$ is a count of the reconstructed gamma ray spectrum in the $i^{th}$ channel, $y_j$ is a relative yield of the $j^{th}$ element, and $a_{ij}$ is a count of the normalized elemental capture standard gamma ray spectrum of single element of the $j^{th}$ element in the $i^{th}$ channel, and $\varepsilon_i$ is a correction factor, where $\varepsilon_i \leq 0.1$.

11. The unfolding method according to claim 1, wherein, in Step 5, comparing the reconstructed gamma ray spectrum with the measured gamma ray spectrum is carried out according to Equation 6:

$$|c_i - X_i| \leq \varepsilon \quad \text{(Equation 6)}$$

$c_i$ is a count of the measured gamma ray spectrum in the $i^{th}$ channel, $X_i$ is a count of the reconstructed gamma ray spectrum in the $i^{th}$ channel, and $\varepsilon$ is the relative error; and when the relative error is less than or equal to 5%, the unfolding results are regarded as reliable; when the relative error is greater than 5%, the unfolding results are regarded as unreliable.

12. A gamma ray spectrum unfolding device for elemental capture spectroscopy logging, comprising:

a module for acquiring data and determining the primary element types, configured to acquire and analyze research area data at least including elemental capture gamma ray spectroscopy logging data and whole rock oxide analysis data, in order to determine the primary types of elements in the area;

a module for preprocessing the elemental capture gamma ray spectroscopy logging data, configured to preprocess the elemental capture gamma ray spectroscopy logging data, including selection of energy window, energy spectrum smoothing and filtering, normalization, and inelastic scattering information deduction, in order to obtain a preprocessed elemental capture gamma ray spectrum;

a module for constructing a primary element group and an auxiliary element group, configured to construct a primary element group and an auxiliary element group composed of different elements, in order to determine an order of spectrum unfolding for different elements;

a module for unfolding with the least square method on the basis of element groups, configured to, according to the primary element group and the auxiliary element group, firstly unfold the primary elements in the preprocessed elemental capture gamma ray spectrum by using the least square method, deduct the contribution of all the primary elements from the preprocessed elemental capture gamma ray spectrum, and then unfold the auxiliary elements by using the least square method, thereby obtaining the relative yield of each element; and a module for reconstructing gamma ray spectrum and error control, configured to reconstruct the elemental capture gamma ray spectrum according to the relative yield of each element in combination with the normalized elemental capture standard gamma ray spectrum of single element, and compare the reconstructed gamma ray spectrum with the measured gamma ray spectrum to determine whether the unfolding results are reliable.

* * * * *